No. 705,106. Patented July 22, 1902.
D. MACDONALD.
GEARING FOR BICYCLES.
(Application filed Sept. 16, 1901.)

(No Model.) 2 Sheets—Sheet 1.

Witnesses.

Inventor.
Donald Macdonald.
by
Henry Orth
Atty.

No. 705,106. Patented July 22, 1902.
D. MACDONALD.
GEARING FOR BICYCLES.
(Application filed Sept. 16, 1901.)
(No Model.) 2 Sheets—Sheet 2.
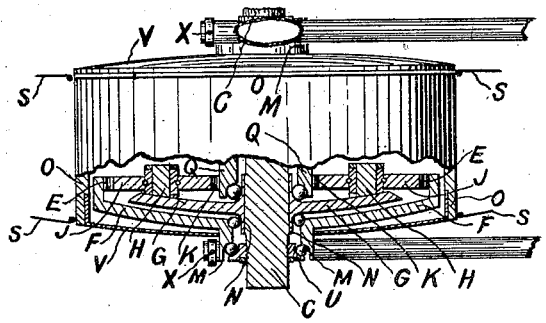
FIG. 3.
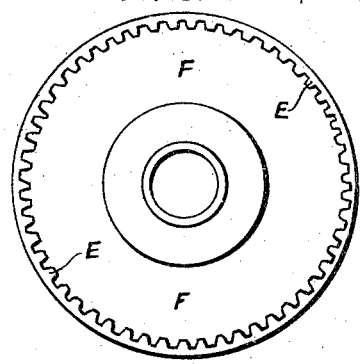
FIG. 4.
FIG. 5.
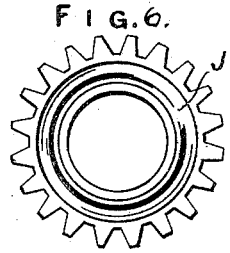
FIG. 6.
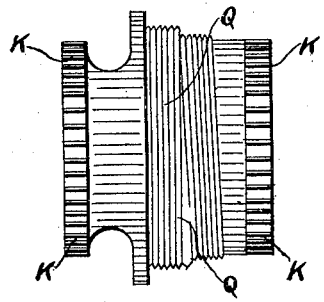
FIG. 9.
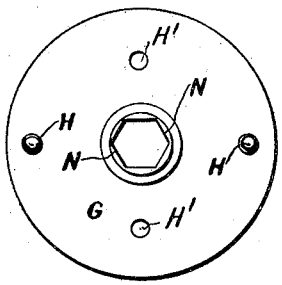
FIG. 7.
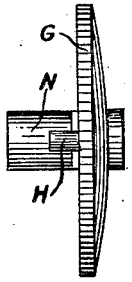
FIG. 8.
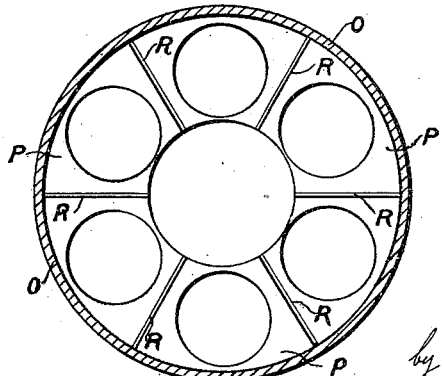
FIG. 10.
Witnesses
Inventor.
Donald Macdonald.
by
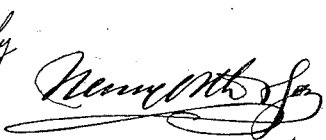
Attys.
THE NORRIS PETERS CO., PHOTO-LITHO., WASHINGTON, D. C.

UNITED STATES PATENT OFFICE.

DONALD MACDONALD, OF ORROROO, SOUTH AUSTRALIA, AUSTRALIA.

GEARING FOR BICYCLES.

SPECIFICATION forming part of Letters Patent No. 705,106, dated July 22, 1902.

Application filed September 16, 1901. Serial No. 75,602. (No model.)

*To all whom it may concern:*

Be it known that I, DONALD MACDONALD, cyclist, a subject of the King of Great Britain, residing at Orroroo, in the State of South Australia, Commonwealth of Australia, have invented an Improvement in Gearing for Bicycles, of which the following is a specification.

This invention relates to certain improvements in the driving-gear of bicycles, and more particularly to the type known as "rear-driven chainless or epicyclic gearing," in which the driving mechanism is applied to the axle of the rear wheel.

Though described more particularly with respect to bicycles, it is to be understood that my invention may be applied to any vehicle capable of being driven by mechanical traction.

The invention essentially consists in an arrangement of parts whereby the driving power is applied from nearly midway of the axle of the rear wheel outward toward the ends. By this means a more equalized strain is imparted to the sides of the frame, thus causing greater rigidity and permitting a material reduction in the weight of the several parts and frame.

The special arrangement and construction of parts are more particularly described, and shown in the accompanying drawings, in which—

Figure 1:
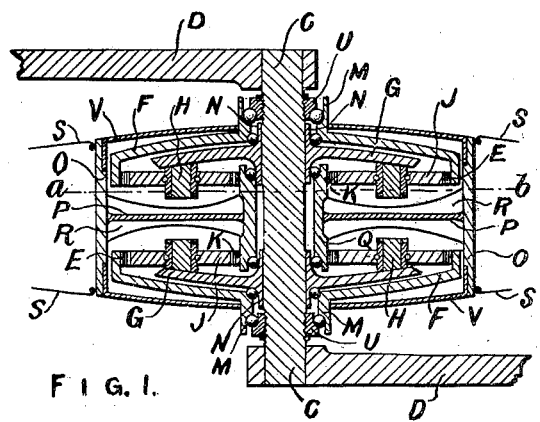
Figure 2:
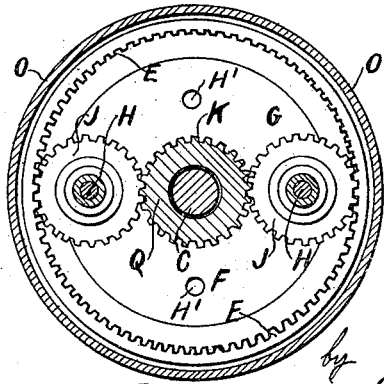

Figure 1 is a sectional plan of the driving-gear; Fig. 2, a sectional plan on the line $a\ b$ of Fig. 1; Fig. 3, a plan of the hub, partly in section, showing the clamping of frame to crown-wheel shank; Fig. 4, a face view of crown-wheel; Fig. 5, an edge view of same; Fig. 6, a view of planet-wheel; Fig. 7, a plan of inner dished disk with spindles for planet-wheels; Fig. 8, an end view of same; Fig. 9, an enlarged side view of lateral tube with hub-cogs for a screwed-on flange; Fig. 10, a plan of central flange of hub with strengthening-stays.

On reference to the drawings it will be seen that in applying my improved driving-gear to a rear-driven chainless bicycle I construct the frame with its rear fork extending vertically from the center of the rear or driving wheel for the seat-pillar, the bicycle being driven by a forward movement and the driving power being applied from immediately above the center of such wheel.

The bicycle is operated by an arrangement of parts as a driving-gear, which is contained or incased in the hub of the rear wheel, the crank-axle C, which extends through the center of the hub, acting also as the axle of the driving-wheel.

My improved epicyclic gearing consists of a crown cog-wheel E, fitted or attached to the periphery of a stationary saucer-shaped disk F, an inner rotatable dished disk G, provided with two or more ball-bearing spindles H, carrying free planet cog-wheels J and a rotatable hub cog-wheel K, mounted on the crank-axle, carrying the pedal-cranks, the whole being so arranged in the manner hereinafter described that the cogs of the several cog-wheels mesh in a straight line parallel to the travel of the machine and as centrally as possible on the axle. These parts are preferably arranged in pairs on both sides of the crank-axle, one part of each set being fitted on or over the crank-axle from the outermost sides toward the center, as is illustrated in Fig. 1 and herein described.

The stationary saucer-shaped disks F, carrying the internal crown-cogs on their periphery, are provided with shanks M, which shanks extend outwardly from the center of the disks on the convex side, are bored for the crank-axle to pass through, and have two ball-races cut in their inner face for bearings on the crank-axle.

The inner dished disks G are provided with two or more ball-bearing spindles H near their outer edge on the concave side, and upon these spindles are suitably mounted a corresponding number of free planet cog-wheels J. If it is so desired, two or more sets of spindles may be provided on each disk to permit of a variation in the gearing by the employment of greater or smaller planet cog-wheels to mesh with corresponding hub-cogs. One of the disks G is detachable unless a sectional axle is used, when its position may be adjusted by the adjustable screw. They are centrally bored and fitted onto suitable metal shapes N on the crank-axle C to revolve with it. At the point at which they join the axle the shanks of the disks are turned into cones to act as bearings and have ball-races on their inner or concave sides for the wheel proper and ball-races on their outer or convex sides for the crown-cog-wheel shank M. The hub-cogs will be hereinafter described.

By the use of free planet cog-wheels on ball-bearing spindles running inside a fixed crown-wheel and arranged to rotate with it and to transmit their rotation to the driving-wheel multiplication of driving power is secured in the driving mechanism without increasing the length of the pedal-cranks.

The hub of the rear wheel consists of a metal barrel O, to which the spokes are fitted, as usual. The barrel O is affixed about midway from its ends to a lateral pipe or tube Q, which serves as the boss of the driving-wheel hub by an internal flange in the form of a metal disk or web P. The flange or suspended web, which takes the lateral strain of the rider's weight, is preferably strengthened by a series of light metal stays R, fixed transversely to the barrel and tube. The lateral tube Q is fitted upon bearings on the crank-axle at about its center, whereby it is practically relieved of all frictional strain, and is provided at each of its outer ends with hub or driven cogs K, either cut in the solid or screwed on to permit of an interchangeable gearing, and on its inner surface carries ball-races for the wheel-bearing. By this combined arrangement the driving-wheel is mounted directly on the crank-axle and bears practically all the weight on the wheel direct. By the use of two or more planet-wheels on either side of the axle the strain of the drive is equalized. Two sets are preferably used, as in Fig. 1, that the strain produced by the driving power from the fixed crown-wheels shall be divided on both sides of the machine.

The axle may be made with one of the inner dished disks G in one piece, having holes H' bored in it to take pins or screws for ball-races for planet-cogs. In such case the disk G on the other side of the axle is made removable, that the center or hub proper may be put on the axle, as in Fig. 1. All the parts are on ball-bearings. The center may be made with the two cogs in such a way that the hub or flange can be screwed onto it with a right-handed thread and a left-handed nut, so that changes in gear can easily be effected by removing the center, Fig. 9, and replacing it with a smaller or larger hub-cog and corresponding planet-wheels. When so arranged, holes H' are made in the inner disk G, Fig. 7, at different distances from the center for the corresponding planet-wheels.

The operation of my improved driving-gear is as follows: On the pedal-cranks and crank-axle C being revolved the inner dished disks G, attached to the crank-axle and carrying the free planet cog-wheels J, revolve in the same direction. The free planet cog-wheels J, mounted on the ball-bearing spindles H, are thereby carried forward, but being meshed with the stationary crown cog-wheels E are revolved backward. The cog-wheels J, meshing with the hub cog-wheels on the lateral tube Q, revolve them, and through the flange carry the barrel forward on which the driving-wheel is mounted, giving forward motion to the machine.

To apply my improved driving-gear, the axle C is passed through the lateral tube Q until the latter, and therefore the wheel proper, is about central on it. The free planet-cogs are fitted in position on the ball-bearing spindles of the inner dished disks, and these inner dished disks G are then attached to the axle C at equal distances from the end, their convex surfaces being outward, the one which is detachable being fitted to the metal shape on the axle to insure its revolving with it. The stationary saucer-shaped disks F, carrying the crown cog-wheels E, are then placed over the axle C in position one behind each of the inner dished disks G, carrying the ball-bearing spindles H and planet-cogs J, so that the planet cog-wheels J mesh with the hub cog-wheels K on the lateral tube Q and with the crown-wheel cogs E. Cones U are screwed on the crank-axle C at the ends of the shanks M of the stationary disks F to receive the outer bearings of the crown cog-wheels, by which fixing the wheel-bearings are adjusted. Two disks or flanges V, having a central boring for the shanks of the stationary disk F, that they may revolve with the hub independently of the axle-bearings, are screwed into the sides of the barrel O and inclose the driving-gear within an oil-retaining dust-proof hub. The frame of the rear wheel is now firmly clamped to the crown-cog-wheel shanks M by means of clamps X, which render the crown cog-wheels stationary, and the pedal-cranks D are fitted to the crank-axle. It now only remains for the front wheel, handle-bar, and saddle, with other parts, to be fixed in position, as usual, for the bicycle to be ready for use.

What I claim, and desire to secure by Letters Patent of the United States, is—

1. The combination with a driven axle and a barrel forming the center of a wheel and having a flange intermediate its ends; of a toothed wheel-hub bearing on said axle and secured centrally of said flange, and planet-gear on each side of said hub driven by the axle and arranged to drive the hub and thereby drive the barrel and wheel, substantially as herein described.

2. The combination with a crank-axle, two saucer-shaped disks secured thereto, oppositely-situated planet-wheels revolubly mounted on each disk, a fixed crown-wheel on each end of the crank-axle in which the latter is revolubly supported, of a changeable wheel-hub between the disks on the axle and having a cog-wheel formed on each end, a pair of planet-wheels adapted to mesh with each cog and crown wheel, a barrel inclosing all of the aforesaid elements and a web centrally and rigidly connecting the hub and barrel, substantially as herein described.

3. The combination with a driven axle and a barrel forming the center of a wheel and having an internal flange intermediate its ends; of a removable, toothed wheel-hub having bearing on the axle and secured centrally of said flange, and planet-gear on each side of the web, driven by the axle and arranged to drive said hub and thereby drive the barrel and wheel, substantially as herein described.

In testimony that I claim the foregoing as my invention I have signed my name in presence of two subscribing witnesses.

DONALD MACDONALD.

Witnesses:
CHARLES ANDREW MURPHY,
CHARLES STANLEY BURGESS.